J. P. Haskins,
Soda-Water Apparatus,
Nº 60,001. Patented Nov. 27, 1866.
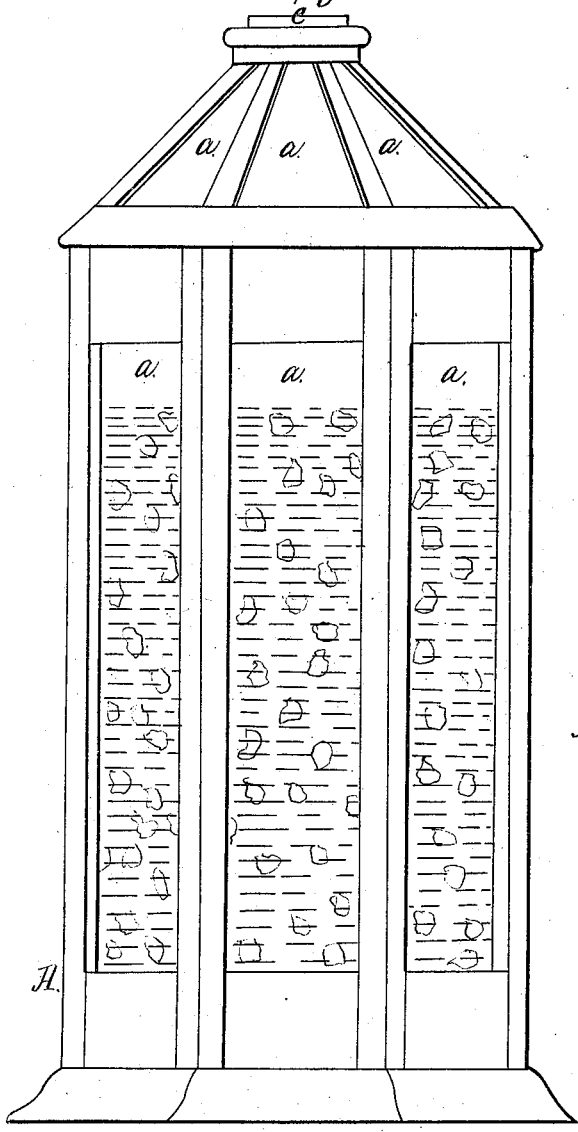
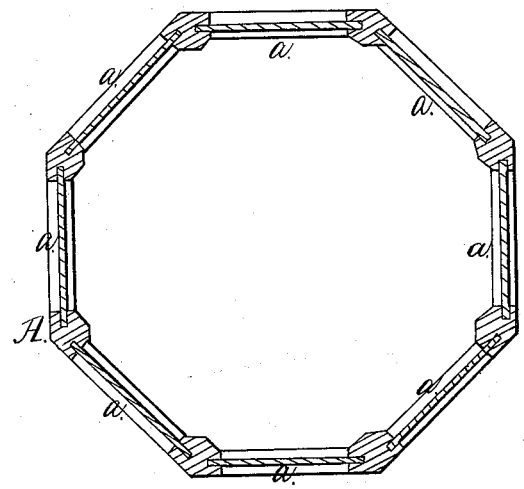
Witnesses:
P. T. Dodge,
J. Case.
Inventor
J. P. Haskins
By W. E. Dodge
Atty

United States Patent Office.

IMPROVED METHOD OF EXHIBITING THE GAS OF MINERAL SPRINGS.

J. P. HASKINS, OF SARATOGA SPRINGS, NEW YORK.

Letters Patent No. 60,001, dated November 27, 1866.

SPECIFICATION.

TO ALL WHOM IT MAY CONCERN:

Be it known that I, J. P. HASKINS, of Saratoga Springs, in the county of Saratoga, and State of New York, have invented certain new and useful improvements in Exhibiting the Gases in Mineral Waters; and I do hereby declare that the following is a full, clear, and exact description thereof, reference being had to the accompanying drawing making part of this specification, in which—

Figure 1 is a side elevation.

Figure 2 a horizontal section.

Like letters indicate like parts in each of the figures.

The object of my invention is to exhibit the gas or gases, contained in the water of mineral or medicinal springs, as the former rises through the water and previous to its escape therefrom. To accomplish this object, I first dig down to the vein of water, where it issues from the solid earth or rock, as the case may be, and then insert or build around it a tube of sufficient capacity to conduct the water to the surface. This tube or aqueduct must be so constructed as not to permit the escape of the water or gas until it reaches the surface. Attached to this tube, at or above the surface of the ground, is the reservoir, A, into which the water rises from below, as represented in fig. 1. The gas contained in the water will then rise through it, in the form of globules, which, as they ascend through the water and emerge into the light, will resemble globules of quicksilver; thus rendering them plainly visible to the eye of the spectator. This reservoir may be constructed as represented, of a suitable frame, with glass inserted in its sides, as represented by $a$, and may be made of any size or form that fancy may dictate, or, when convenient, a single glass tube of proper size may be used, and thus dispense with the frame. An opening is left at the top, as at $e$, for the escape of the gas after it leaves the water. Where the water will not rise naturally into the reservoir, the latter may be located at a lower elevation and the water be conveyed to it by pipes, or it may be forced by artificial means up into the reservoir; but in all cases care must be taken to prevent the escape of the gas from the water before reaching the reservoir, which only requires that the spring be covered over air-tight, and the pipe connected thereto, so as to receive and convey the water with the gas as they rise from the spring, and permit no escape of the gas until it rises through the water in the reservoir.

Having thus described my invention, what I claim, is—

The method herein described of exhibiting the gas contained in mineral waters, while they are ascending through the same, and before reaching the surface.

J. P. HASKINS.

Witnesses:
S. B. LAKE,
JOSEPH A. HASKINS.